(12) United States Patent
Hsieh

(10) Patent No.: US 11,350,486 B2
(45) Date of Patent: May 31, 2022

(54) WIRELESS COMMUNICATION METHOD FOR EARPHONES, MASTER EARPHONE, SLAVE EARPHONE, EARPHONE SYSTEM

(71) Applicant: 1MORE INC., Shenzhen (CN)

(72) Inventor: Kuan-hong Hsieh, Guangdong (CN)

(73) Assignee: 1MORE INC., Shenzhen (CN)

( * ) Notice: Subject to any disclaimer, the term of this patent is extended or adjusted under 35 U.S.C. 154(b) by 66 days.

(21) Appl. No.: 17/080,863

(22) Filed: Oct. 27, 2020

(65) Prior Publication Data

US 2021/0045191 A1 Feb. 11, 2021

Related U.S. Application Data

(63) Continuation of application No. PCT/CN2018/085143, filed on Apr. 28, 2018.

(51) Int. Cl.
*H04W 84/20* (2009.01)
*H04R 5/033* (2006.01)

(52) U.S. Cl.
CPC ............ *H04W 84/20* (2013.01); *H04R 5/033* (2013.01); *H04R 2420/07* (2013.01)

(58) Field of Classification Search
CPC ........ H04W 84/20; H04W 4/80; H04R 5/033; H04R 2420/07; H04R 1/1016; H04R 1/1041; H04R 1/1008; H04R 2201/10; H04L 65/1069; H04L 65/80
USPC .......... 381/74, 26, 309, 311, 384; 455/575.2
See application file for complete search history.

(56) References Cited

U.S. PATENT DOCUMENTS

| 8,768,252 | B2* | 7/2014 | Watson | H04L 1/16 |
| | | | | 455/3.06 |
| 10,019,222 | B2* | 7/2018 | Hsieh | G06F 3/167 |
| 10,206,039 | B1* | 2/2019 | Yun | H04R 3/12 |
| 10,425,737 | B2* | 9/2019 | Hsieh | H04L 65/1069 |
| 10,715,898 | B2* | 7/2020 | Li | H04R 1/1058 |
| 10,728,941 | B2* | 7/2020 | Batta | H04M 1/6066 |
| 11,043,980 | B2* | 6/2021 | Gong | H04R 1/1041 |

(Continued)

FOREIGN PATENT DOCUMENTS

| CN | 102696240 A | 9/2012 |
| CN | 106535081 A | 3/2017 |
| CN | 107894881 A | 4/2018 |

*Primary Examiner* — Xu Mei
(74) *Attorney, Agent, or Firm* — Andrew C. Cheng

(57) ABSTRACT

A wireless communication method for earphones includes: based on a standard communication protocol, extending a standard reception time for a communication between the master earphone and an audio source device to obtain an extended reception time, and extending a standard transmission time for the communication between the master earphone and the audio source device to obtain an extended transmission time; the master earphone wirelessly communicating with the slave earphone within the extended reception time; and the master earphone wirelessly communicating with the slave earphone within the extended transmission time. The master earphone establishes a wireless communication with the slave earphone within the extended reception time or the extended transmission time, so that the data reception reliability of the slave earphone and the communication efficiency between the master earphone and the slave earphone are improved.

14 Claims, 5 Drawing Sheets

(56) References Cited

U.S. PATENT DOCUMENTS

| | | | |
|---|---|---|---|
| 2009/0154739 A1* | 6/2009 | Zellner | H04R 3/00 381/311 |
| 2012/0230510 A1* | 9/2012 | Dinescu | H04R 5/033 381/80 |
| 2014/0003617 A1* | 1/2014 | Wang | H04R 3/00 381/74 |
| 2017/0366924 A1* | 12/2017 | Thoen | H04W 84/20 |
| 2018/0176717 A1* | 6/2018 | Fu | H04W 4/80 |

* cited by examiner

WIRELESS COMMUNICATION METHOD FOR EARPHONES, MASTER EARPHONE, SLAVE EARPHONE, EARPHONE SYSTEM

BACKGROUND OF THE INVENTION

1. Technical Field

This application relates to the technical field of earphones, in particular to a wireless communication method for earphones, a master earphone, a slave earphone, and an earphone system.

2. Description of Related Art

With the development of smart wearable devices, Bluetooth earphones are becoming more and more popular on the market. True wireless stereo (TWS) earphones, abbreviated as TWS earphones, have emerged on the market. The TWS earphone includes a master earphone and a slave earphone and typically operates in such a manner: the master earphone wirelessly communicates with a mobile phone via Bluetooth, receives data sent from the mobile phone based on a standard Bluetooth communication sequence, and then transmits the received data to the slave earphone.

In the process of achieving this application, the applicant found that in the prior art, the master earphone will undergo a bandwidth limitation of the Bluetooth standard protocol when transmitting data received from the mobile phone to the slave earphone, thus being poor in anti-interference capacity, and that the reception of the slave earphone cannot be guaranteed and the communication efficiency is low due to the limitation of the head width of users.

BRIEF SUMMARY OF THE INVENTION

One objective of the embodiments of this application is to provide a wireless communication method for earphones, a master earphone, a slave earphone, and an earphone system to realize a high communication efficiency.

To solve the aforesaid technical problems, the embodiments of this application provide the following technical solutions:

In one aspect, an embodiment of this application provides a wireless communication method for earphones. The wireless communication method is applied to a master earphone and a slave earphone, wherein the master earphone wirelessly communicates with an audio source device based on a standard communication protocol, and the slave earphone acquires data transmitted from the audio source device to the master earphone in a listening mode. The wireless communication method comprises:

Based on the standard communication protocol, within a cycle of data receiving and transmitting between the master earphone and the audio source device, extending a standard reception time for a communication between the master earphone and the audio source device to obtain an extended reception time, and extending a standard transmission time for the communication between the master earphone and the audio source device to obtain an extended transmission time, wherein according to the standard communication protocol, the cycle of data receiving and transmitting between the master earphone and the audio source device comprises the standard reception time, the extended reception time, a first idle time, the standard transmission time, the extended transmission time and the second idle time;

Establishing a wireless communication link between the master earphone and the slave earphone within the extended reception time; and Establishing a wireless communication link between the master earphone and the slave earphone within the extended transmission time.

Optionally, after the slave earphone acquires the data transmitted from the audio source device to the master earphone in the listening mode, the master earphone receives result of data acquisition of the slave earphone within the extended reception time.

Optionally, after receiving the data transmitted from the audio source device within the standard reception time, the master earphone integrates result of data reception thereof and the result of data acquisition of the slave earphone and then transmits integrated results to the audio source device within the standard transmission time.

Optionally, the master earphone integrates result of data reception thereof and the result of data acquisition of the slave earphone and then transmits integrated results to the audio source device within the standard transmission time comprises:

Judging, by the master earphone, whether or not the result of data reception of the master earphone and/or the result of data acquisition of the slave earphone have/has error; and Requesting, by the master earphone, the audio source device to retransmit the data/to transmit other data according to a judgment result.

Optionally, requesting, by the master earphone, the audio source device to retransmit the data/to transmit other data according to a judgment result comprises:

Requesting, by the master earphone, the audio source device to retransmit the data within the standard transmission time if the result of data reception of the master earphone has error and/or the result of data acquisition of the slave earphone has error; or Requesting, by the master earphone, the audio source device to transmit other data within the standard transmission time if the result of data reception of the master earphone and the result of data acquisition of the slave earphone has no error.

Optionally, after requesting the audio source device to retransmit the data/to transmit other data, the master earphone transmits a confirmation message to the slave earphone within the extended transmission time to enable the slave earphone to listen to the data once again/to listen to other data.

Optionally, the wireless communication link is a Bluetooth communication link.

In the second aspect, an embodiment of this application provides a master earphone, comprising a memory configured to store an instruction and at least one processor configured to execute the instruction to implement a method comprising:

based on a standard communication protocol, within a cycle of data receiving and transmitting between the master earphone and the audio source device, extending a standard reception time for a communication between the master earphone and the audio source device to obtain an extended reception time, and extending a standard transmission time for the communication between the master earphone and the audio source device to obtain an extended transmission time, wherein according to the standard communication protocol, the cycle of data receiving and transmitting between the master earphone and the audio source device comprises the standard reception time, the extended reception time, a first idle time, the standard transmission time, the extended transmission time and the second idle time;

the master earphone receiving data from the audio source device in the standard reception time;

the master earphone obtaining a result of data acquisition of a slave earphone within the extended reception time;

the master earphone integrating a result of data reception thereof and the result of data acquisition of the slave earphone to form an integrated result and transmitting the integrated result to the audio source device within the standard transmission time; and the master earphone sending a confirmation massage to the slave earphone within the extended transmission time.

In the third aspect, an embodiment of this application provides a computer program product which includes a computer program stored in a nonvolatile computer-readable storage medium, wherein the computer program includes a program instruction, and the master earphone executes the program instruction to implement the wireless communication method for the earphones mentioned above.

In the fourth aspect, an embodiment of this application provides a nonvolatile computer-readable storage medium having a computer-executable instruction stored therein, wherein the computer-executable instruction enables the master earphone to implement the wireless communication method for the earphones mentioned above.

In the fifth aspect, an embodiment of this application provides a slave earphone, comprising:

At least one processor; and

A memory in a communication connection with the at least one processor, wherein an instruction to be executed by the at least one processor is stored in the memory, and the at least one processor executes the instruction to implement the wireless communication method for the earphones mentioned above.

In the sixth aspect, an embodiment of this application provides a computer program product which includes a computer program stored in a nonvolatile computer-readable storage medium, wherein the computer program includes a program instruction, and the slave earphone executes the program instruction to implement the wireless communication method for the earphones mentioned above.

In the seventh aspect, an embodiment of this application provides a nonvolatile computer-readable storage medium having a computer-executable instruction stored therein, wherein the computer-executable instruction enables the slave earphone to implement the wireless communication method for the earphones mentioned above.

In the eighth aspect, an embodiment of this application provides an earphone system which comprises the master earphone and the slave earphone, wherein the master earphone is in a wireless communication with the slave earphone. The master earphone comprises a first processor and a first memory configured to store a first instruction, and the slave earphone comprises a second processor and a second memory configured to store a second instruction, the first and second processors being configured to execute the first and second instructions to implement a method comprising:

based on a standard communication protocol, within a cycle of data receiving and transmitting between the master earphone and the audio source device, extending a standard reception time for a communication between the master earphone and the audio source device to obtain an extended reception time, and extending a standard transmission time for the communication between the master earphone and the audio source device to obtain an extended transmission time, wherein according to the standard communication protocol, the cycle of data receiving and transmitting between the master earphone and the audio source device comprises the standard reception time, the extended reception time, a first idle time, the standard transmission time, the extended transmission time and the second idle time;

the master earphone receiving data from the audio source device within the standard reception time;

the slave earphone listening to the data transmitted from the audio source device to the master earphone within a standard listening time;

the slave earphone transmitting a result of data acquisition thereof to the master earphone within the extended reception time;

the master earphone integrating a result of data reception thereof and the result of data acquisition of the slave earphone to form an integrated result and transmitting the integrated result to the audio source device within the standard transmission time; and the master earphone sending a confirmation massage to the slave earphone within the extended transmission time.

According to the wireless communication method for earphones, the master earphone, the slave earphone, and the earphone system provided by the embodiments of this application, the master earphone carries out a wireless communication with the audio source device based on the standard communication protocol; the slave earphone acquires data transmitted from the audio source device to the master earphone in a listening mode; based on the standard communication protocol, a standard reception time for the communication between the master earphone and the audio source device is extended to obtain an extended reception time, and a standard transmission time for the communication between the master earphone and the audio source device is extended to obtain an extended transmission time; the master earphone carries out a wireless communication with the slave earphone within the extended reception time and carries out a wireless communication with the slave earphone within the extended transmission time. The master earphone carries out a wireless communication with the slave earphone within the extended reception time or the extended transmission time, so that the data reception reliability of the slave earphone and the communication efficiency between the master earphone and the slave earphone are improved.

BRIEF DESCRIPTION OF THE DRAWINGS

One or more embodiments are illustratively described below in conjunction with the corresponding accompanying drawings. These illustrative descriptions are not intended to limit the embodiments. Identical reference numbers in the drawings represent similar elements. Unless otherwise specifically stated, the drawings are not drawn to scale.

DETAILED DESCRIPTION OF THE INVENTION

To gain a better understanding of the purposes, technical solutions, and advantages of this application, this application is further expounded below in conjunction with the accompanying drawings and embodiments. It should be understood that the specific embodiments in the following description are merely for explaining this application, and are not intended to limit the application.

The earphones provided by the embodiments of this application are configured to be at least partially worn on, near, or in one or two of the two ears of users. Although the structure and shape of the earphones present various changes, the technical solutions provided by this application are suitable for earphones of any structures and shapes, such as in-ear phones, headphones, and ear-hook phones.

"Earphone" is described in other ways in other business or technical fields, for example, "earphone" may be called "interphone", "hearing-aid", or "speaker", the technical solutions provided by the embodiments of this application are suitable for any audio devices with functions similar to or identical with those of "earphone".

Any users would appreciate that the technical solutions provided by the embodiments of this application can be applied to any appropriate operating modes. For example, based on the technical solutions provided by the embodiments of this application, a master earphone and a slave earphone can be switched to a double-earphone connection mode, a double-earphone disconnection mode, a double-earphone simultaneous operating mode, a single-earphone operating mode, a walkie-talkie like mode, or the like.

Figure 1:
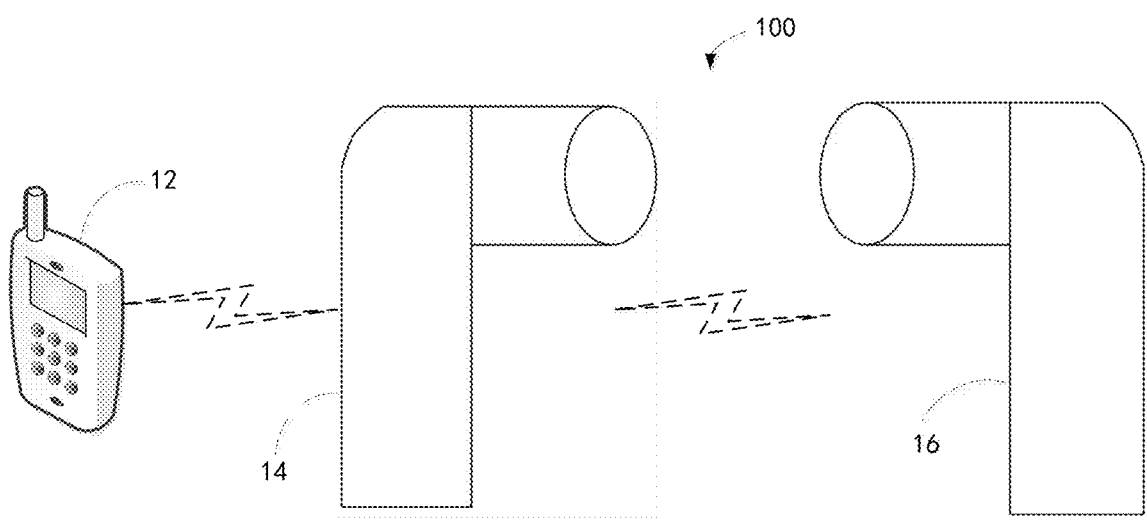
FIG. 1 illustrates an earphone system provided by embodiments of this application.

Refer to FIG. 1 which illustrates an earphone system provided by an embodiment of this application. As shown in FIG. 1, an earphone system 100 comprises a first audio source device 12, a master earphone 14 and a slave earphone 16. The master earphone 14 is wirelessly connected to the slave earphone 12, and is also wirelessly connected to the first audio source device 12.

"Wireless connection" involved in this specification refers to any suitable wireless communication connections, such as a Bluetooth connection. In this embodiment, the master earphone 14 is respectively connected to the slave earphone 16 and the first audio source device 12 via Bluetooth.

The first audio source device 12 (as well as all audio source devices mentioned hereafter) may be any suitable devices having a capacity to provide audio contents or to play audio data, as well as a storage capacity, such as a smart phone, a tablet computer, an MP3 player, a personal computer, a laptop, a personal speaker, a CD player, or other smart/non-smart terminal devices. The first audio source device 12 is coupled to at least one storage medium for storing audio data, such as memories in user terminal devices or storage media on the Internet, and acquires audio files from the storage medium. In addition, the first audio source device 12 may be a combination of one or more electronic devices, for example, a combination of a smart phone and an analog-digital converter (ADC) connected to the smart phone.

In some embodiments, the first audio source device 12 is connected to the master earphone 14/the slave earphone 16 by means of an internal or external Bluetooth module or chip. When two devices with the Bluetooth function are connected, they will acquire protocols provided by the corresponding devices. Data exchange will be performed only if the protocols acquired by the two devices are identical. Wherein, the first audio source device 12 supports A2DP and AVRCP, and also supports SBC (Sub Band Coding), MP3, AAC (Advanced Audio Coding), Apt-X, and the like, wherein the maximum double-channel coding rate of SBC under double channels at 44.1 kHz is 328 kbit/s, the coding rate of AAC can reach 320 kbit/s, and the coding rate of Apt-X can reach 352 kbit/s.

In some embodiments, the first audio source device 12 may be a local audio device which comprises a USB interface device and an analog interface device (ADC/SPDIF/I2S). Audio data is cached in an internal RAM of the first audio source device 12 via a local audio interface and is encoded by SBC.

During Bluetooth communication, devices with the Bluetooth function do not need to follow all Bluetooth profiles. To ensure that different Bluetooth devices are compatible, some application layer profiles are defined in the Bluetooth profiles to point out how the devices with the Bluetooth function are connected or applied.

Wherein, A2DP (Advanced Audio Distribution Profile) is a subclass of the Bluetooth profiles mentioned above, is used to transmit protocol stacks and usage methods of high-quality music file data, and is enacted specially for transmitting stereo sounds via Bluetooth.

AVRCP (Audio/Video Remote Control Profile) provides a standard interface for controlling TVs, HI-FI devices, and the like. This profile allows a single remote control device (or other devices) to control all A/V devices that users can access.

As shown in FIG. 1, the master earphone 14 can only be connected to one first audio source device 12 via Bluetooth. When connected to the slave earphone 16 via Bluetooth, the master earphone 14 receives and plays audio signal transmitted from the first audio source device 12, and the slave earphone 16 acquires the audio signal transmitted from the first audio source device 12 to the master earphone 14 by listening and plays the audio signal, so that a dual stereo effect is realized.

As mentioned above, the master earphone 14 is wirelessly connected to the slave earphone 16, so that the degree of freedom of the master/slave earphones is greatly expanded, users can use the master/slave earphones more flexibly, and a TWS effect is realized.

Figure 2:
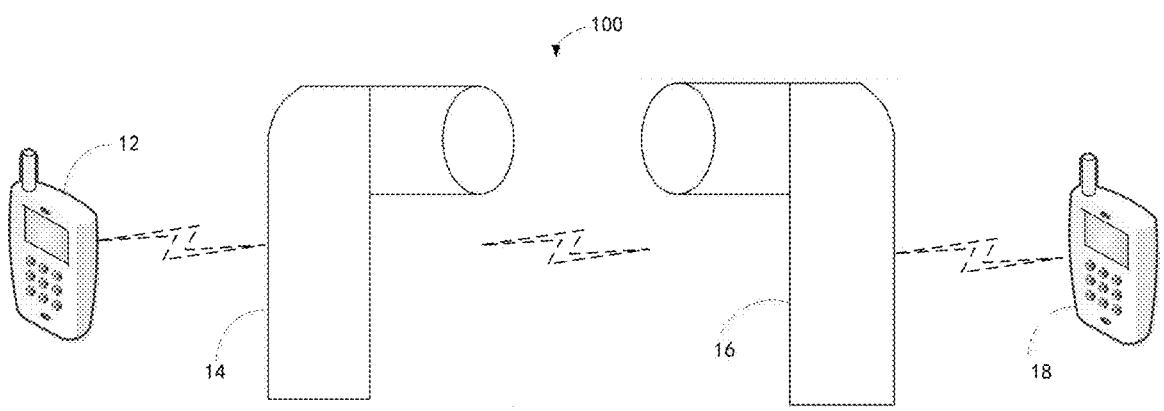
FIG. 2 illustrates another earphone system provided by embodiments of this application.

It should be noted that the roles of the master earphone 14 and the slave earphone 16 are not constant and can be exchanged to adapt to different audio source devices. For example, as shown in FIG. 2 which illustrates another earphone system provided by an embodiment of this application, the earphone system 100 further comprises a second audio source device 18 which is connected to the slave earphone 16 via Bluetooth.

For the first audio source device 12, the "master earphone 14" serves as a master earphone, and the "slave earphone 16" serves as a slave earphone. For the second audio source device 18, the "slave earphone 16" serves as a master earphone, and the "master earphone 14" serves as a slave earphone.

In the above-mentioned embodiments, the earphone system 100 can operate in a TWS mode. In the TWS mode, each earphone can be connected to one audio source device at most, and the earphone system 100 can be connected to two audio source devices at most for one set of TWS conversation.

The TWS conversation in the embodiments of this application are further expounded below:

Completing pairing: before the TWS conversation, the first audio source device 12 is paired with the master earphone 14 via Bluetooth, and the second audio source device 18 is paired with the slave earphone 16 via Bluetooth.

Establishing the TWS conversation: the first audio source device 12 establishes a TWS conversation with the master earphone 14, and the second audio source device 18 establishes a TWS conversation with the slave earphone 16.

Audio playing: after the TWS conversations are established, when the first audio source device 12 plays an audio signal, the master earphone 14 receives a first audio signal, and the slave earphone 16 acquires the first audio signal by listening; when the second audio source device 18 plays a second audio signal, the slave earphone 16 receives the second audio signal, and the master earphone 14 acquires the second audio signal by listening.

With reference to the description of the TWS conversation process, those skilled in the art can complete the TWS conversation process by means of any suitable earphone circuits.

Figure 3:
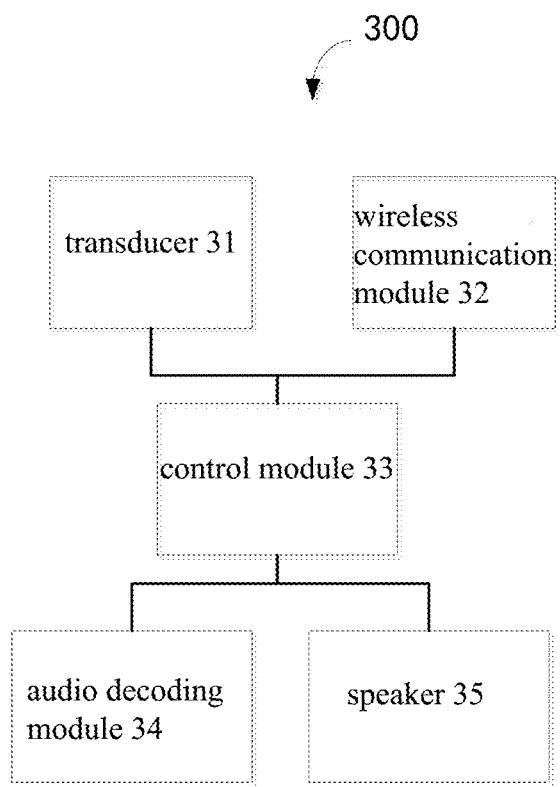
FIG. 3 is a circuit block diagram of an earphone provided by embodiments of this application.

Referring to FIG. 3, an earphone 300 comprises a transducer 31, a wireless communication module 32, a control module 33, an audio decoding chip 34, and a speaker 35. The control module 33 is respectively connected to the transducer 31, the wireless communication module 32, the audio decoding chip 34, and the speaker 35.

The transducer 31 is configured to collect environmental noise signals or audio signals, wherein the audio signals may be sent by a user or by other audio source devices. The transducer 31 may be disposed at a proper position outside a housing of the earphone 300 and may be any suitable acoustoelectric transduction devices, such as a microphone.

The wireless communication module 32 is configured to be wirelessly connected to the audio source device or the master/slave earphone, and receive audio signals transmitted from the audio source device or the master/slave earphone. The wireless communication module 32 is based on a short-distance communication technology such as Bluetooth, RFID, IrDA, UWB, or ZigBee.

The control module 33, as the key control part of the earphone 300, is configured to fulfill various functions of the earphone in cooperation with other devices. For example, the control module 33 receives the audio signal collected by the transducer 31 and transmits the audio signal to the audio source device through the wireless communication module 32. For another example, the wireless communication module 32 receives the audio signal transmitted by the audio source device and transmits the audio signal to the audio decoding chip 34 under the control of the control module 33, the audio decoding chip 34 decodes the audio signal, and the control module 33 plays the decoded audio signal through the speaker 35. For another example, the control module 33 receives the environmental noise signal collected by the transducer 31 and generates a noise cancellation signal with the same amplitude and opposite phase as the environmental noise signal, so as to reduce the interference of environmental noise.

In some embodiments, the wireless communication module 32, the control module 33, and the audio decoding chip 34 may be packaged in the same integrated chip. This application has no limitation to the circuit structure of the wireless communication module 32, the control module 33, and the audio decoding chip 34.

In this aspect, when the earphone 300 is a master/slave earphone, the transducer 31 is a first/second transducer, the wireless communication module 32 is a first/second wireless communication module, the control module 33 is a first/second control module, the audio decoding chip 34 is a first/second audio decoding chip, and the speaker 35 is a first/second speaker, correspondingly.

Figure 3A:
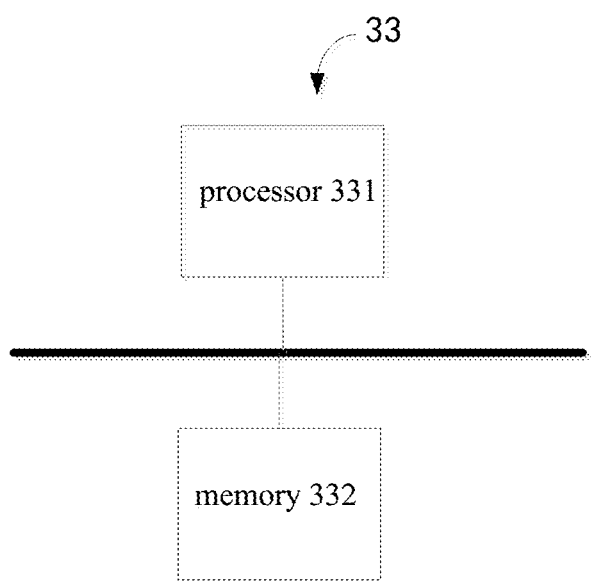
FIG. 3a is a circuit block diagram of a control module in FIG. 3.

Referring to FIG. 3a, the control module 33 comprises a processor 331 and a memory 332.

The processor 331 is connected to the memory 332 and may be at least one of an ASIC, a DSP, a DSPD, a PLD, an FPGA, a processor, a controller, a microcontroller, a microprocessor, and other electronic units for implementing these functions.

In this embodiment, the number of the processor 331 may be one or more.

The memory 332 comprises a high-speed random access memory or a nonvolatile memory, for example at least one disc memory, a flash memory or other nonvolatile solid state memories. In some embodiments, the memory 332 may comprise memories disposed remote from the processor 331, and these remote memories may be connected to the earphone through a network. The network may be, but is not limited to, an internet, an intranet, a local area network, a mobile communication network, and a combination thereof.

The memory 332 is configured to store nonvolatile software programs, nonvolatile computer-executable programs, and modules such as program instructions/units corresponding to the wireless communication method/device for earphones in this application. The processor 331 executes various functional applications and data processing of the earphone by running the nonvolatile software programs, instructions, and units stored in the memory 332, so as to implement the wireless communication method for earphones mentioned above.

Furthermore, this application further provides a computer program product which comprises a computer program stored in a nonvolatile computer-readable storage medium, wherein the computer program comprises a program instruction, and the earphone executes the program instruction to implement the wireless communication method for earphones mentioned above. The earphone may be a master earphone or a slave earphone.

Figure 4:
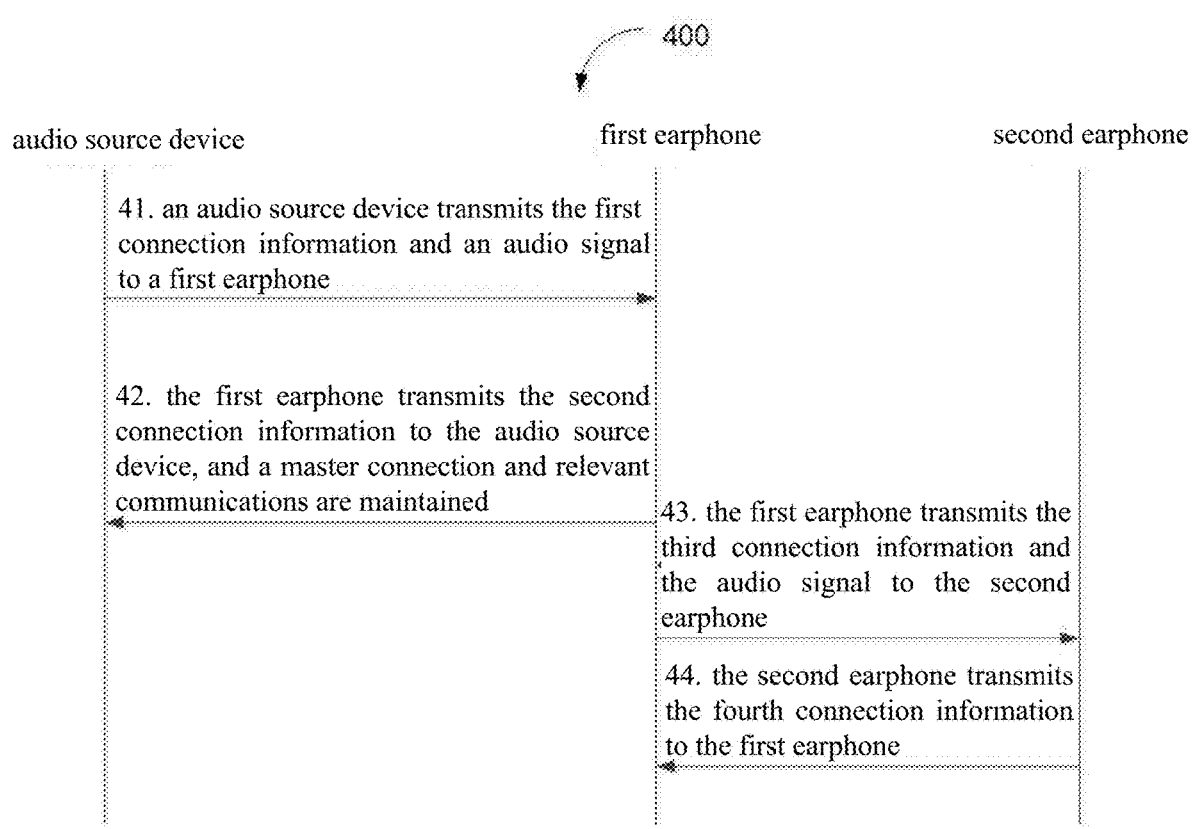
FIG. 4 is a flow diagram of a method for establishing wireless communications of earphones provided by embodiments of this application.

As shown in FIG. 4, which is a flow diagram of a method for establishing the wireless communications of earphones provided by an embodiment of this application, a method 400 for establishing wireless communications of earphones comprises:

41, an audio source device transmits first connection information and an audio signal to a master earphone;

In this embodiment, the master earphone establishes a Bluetooth connection with the audio source device according to the first connection information. The first connection information includes a Bluetooth protocol, device control information, and the like, and the audio signal includes music data or conversation data.

42, the master earphone transmits second connection information to the audio source device, and the master connection and relevant communications are maintained;

43, the master earphone transmits third connection information and the audio signal to the slave earphone;

In this embodiment, the slave earphone establishes a Bluetooth communication with the mater earphone according to the third connection information. The second connection information includes a Bluetooth protocol, device control information, and the like. In this way, the slave earphone can listen to the audio signal transmitted from the audio source device to the master earphone, and the audio signal includes music data or conversation data.

44, the slave earphone transmits fourth connection information to the master earphone.

In this embodiment, the fourth connection information includes a Bluetooth protocol, device control information, and the like.

In this way, the master earphone and the slave earphone establish a wireless communication with the audio source device.

Based on the above communication architecture of the master earphone/slave earphone/audio source device, an embodiment of this application provides a wireless communication method for earphones.

Figure 5:
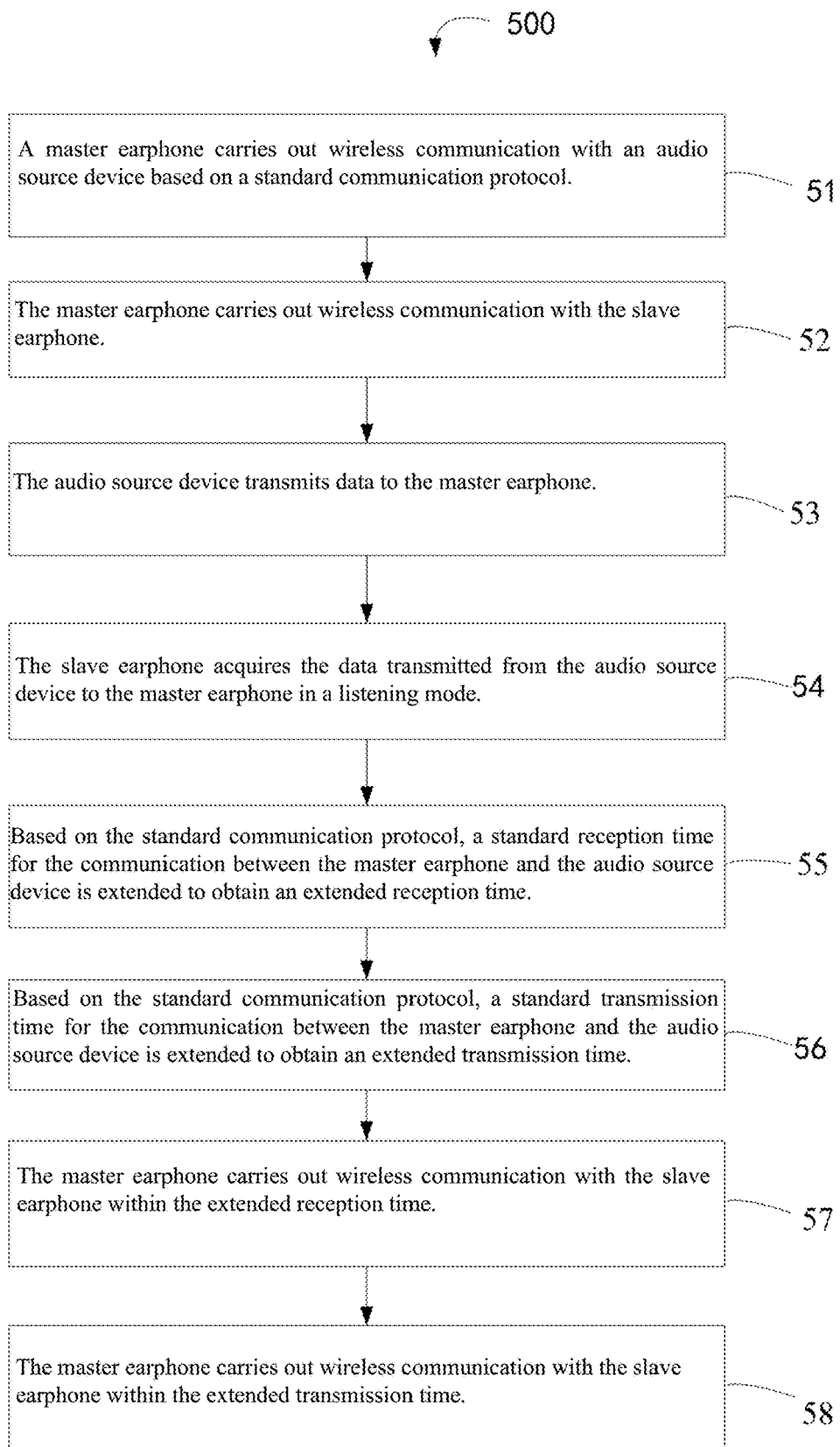
FIG. 5 is a flow diagram of a wireless communication method for earphones provided by an embodiment of this application.

Referring to FIG. 5, the wireless communication method 500 for earphones comprises:

51, building a wireless communication link between the master earphone and the audio source device based on a standard communication protocol;

52, building a wireless communication link between the master earphone and the slave earphone;

In this embodiment, the standard communication protocol may be a standard Bluetooth protocol, and therefore the master earphone establishes a Bluetooth communication with the slave earphone and the audio source device.

Based on the standard Bluetooth protocol, the master earphone, the slave earphone and the audio source device complement each other and collaborate with each other to fulfill a certain function under the control of a standard Bluetooth sequence.

53, the audio source device transmitting data to the master earphone;

In this embodiment, the data may be audio data or other communication data, wherein the audio data includes music data or conversation data.

54, the slave earphone acquiring the data, transmitted from the audio source device to the master earphone, in a listening mode;

55, based on the standard communication protocol, prolonging a standard reception time for the communication between the master earphone and the audio source device to obtain an extended reception time;

56, based on the standard communication protocol, prolonging a standard transmission time for the communication between the master earphone and the audio source device to obtain an extended transmission time;

57, the master earphone wirelessly communicating with the slave earphone within the extended reception time;

58, the master earphone wirelessly communicating with the slave earphone within the extended transmission time.

Figure 6:
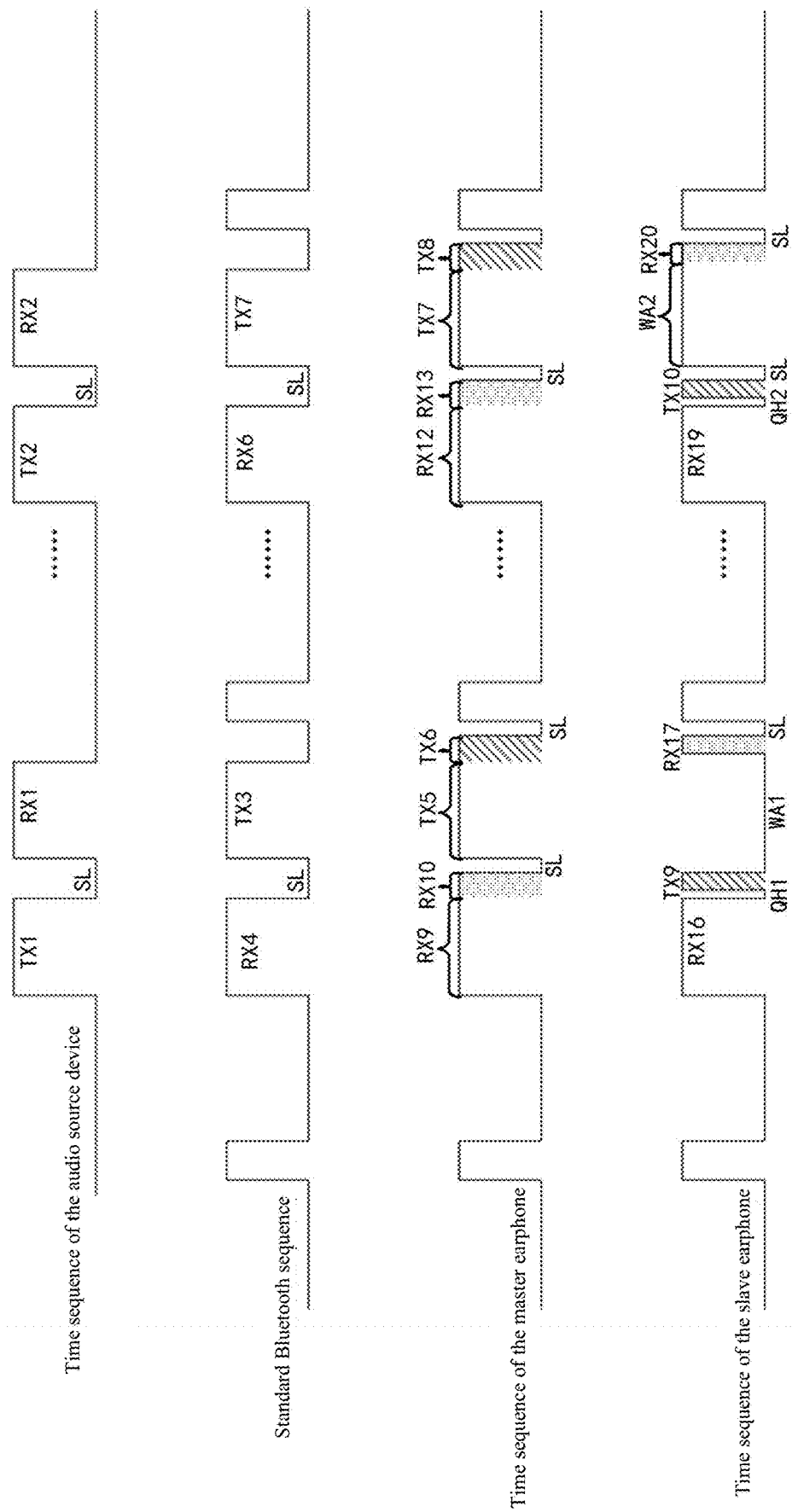
FIG. 6 is an operating sequence diagram of an audio source device, a master earphone, and a slave earphone based on a standard Bluetooth protocol provided by embodiments of this application.

Referring to FIG. 6, in this embodiment, in the standard Bluetooth protocol, the operating sequence of the audio source device may be as follows: standard transmission time TX1, standard idle time SL, standard reception time RX1, standard idle time SL . . . standard transmission time TX2, standard idle time SL, standard reception time RX2 . . . . Wherein, the audio source device is capable of transmitting data to the master earphone within the standard transmission time of the audio source device. The audio source device does not transmit data to or receive data from the master earphone within the standard idle time. The audio source device receives data from the master earphone within the standard reception time.

The standard Bluetooth sequence may be as follows: standard reception time RX4, standard idle time SL, standard transmission time TX3 . . . standard reception time RX6, standard idle time SL, standard transmission time TX7 . . . .

The operating sequence of the master earphone may be as follows: standard reception time RX9, extended reception time RX10, a first idle time SL, standard transmission time TX5, extended transmission time TX6, a second idle time SL . . . standard reception time RX12, extended reception time RX13, the first idle time SL, standard transmission time TX7, standard transmission time TX8 . . . .

The master earphone is capable of receiving data from the audio source device within the standard reception time RX9 of the master earphone and receiving result of data acquisition of the slave earphone within the extended reception time RX10, wherein the result of data acquisition of the slave earphone includes data transmitted from the audio source device to the master earphone and acquired by the slave earphone in the listening mode, and communication data between the slave earphone and the master earphone or some processed data.

It can be seen from FIG. 6 that switching between the standard reception time RX9 and the extended reception time RX10 or between the standard reception time RX12 and the extended reception time RX13 is not needed, that is, the master earphone continues to work within the extended reception time without being switched at the end of the standard reception time, and thus, the master earphone can more efficiently receive data without being switched.

After receiving data transmitted from the audio source device within the standard reception time TX5, the master earphone integrates the result of data reception thereof and the result of data acquisition of the slave earphone and then transmits integrated results of data reception thereof and data acquisition of the slave earphone to the audio source device. For example, the master earphone judges whether or not the result of data reception thereof and/or the result of data acquisition of the slave earphone have/has error and requests the audio source device to retransmit the data/to transmit other data according to the judgment result. For instance, if the result of data reception of the master earphone has error and/or the result of data acquisition of the slave earphone has error, the master earphone requests the audio source device to retransmit data within the standard transmission time; or, if the result of data reception of the master earphone and the result of data acquisition of the slave earphone have no error, the master earphone requests the audio source device to transmit other data within the standard transmission time.

After requesting the audio source device to retransmit data/transmit other data, the master earphone transmits a confirmation message to the slave earphone within the extended transmission time TX6 to enable the slave earphone to listen to the data once again/to listen to other data. For example, when the master earphone judges that the result of data reception thereof and/or the result of data acquisition of the slave earphone do/does not meet preset conditions, the master earphone transmits a confirmation message of "not received" to the slave earphone, and then, the slave earphone listens to the audio data transmitted from the audio source device to the master earphone once again. When the master earphone judges that the result of data reception thereof and/or the result of data acquisition of the slave earphone meet/meets the preset conditions, the master earphone transmits a confirmation message of "received successfully" to the slave earphone and the slave earphone listens to the next frame of audio data transmitted from the audio source device to the master earphone.

The master earphone does not receive data from or transmit data to the audio source device within the first idle time. The master earphone transmits data to the audio source device or the salve earphone within the standard transmission time.

Referring to FIG. 6 again, the operating sequence of the slave earphone may be as follows: standard listening time RX16, switching time QH1, slave transmission time TX9, standard wait time WA1, slave reception time RX17, standard idle time SL . . . standard listening time RX19, switching time QH2, slave reception time TX10, standard idle time SL, standard wait time WA2, slave reception time RX20, standard idle time SL . . . .

The slave earphone is capable of listening to the data transmitted from the audio source device within the standard listening time RX16.

During the switching time QH1, the master earphone does not receive data from or transmit data to the audio source device and therefore the slave earphone does not receive data from or transmit data to the audio source device. In addition, when the time sequence corresponding to the standard listening time RX16 is identical with the time sequence corresponding to the standard reception time RX9 of the master earphone, the time sequence corresponding to the switching time QH1 is opposite to the time sequence corresponding to the standard listening time RX16, such that the slave earphone can be reliably switched to a transmission mode according to the switching time QH1, and in the transmission mode, the slave earphone transmits data to the master earphone.

The slave earphone transmits the result of data acquisition to the master earphone within the slave transmission time TX9.

During the standard wait time WA1, the slave earphone operates in a wait mode and the master earphone transmits data to the audio source device.

Within the slave reception time RX17, the slave earphone operates in a reception mode to receive the confirmation message transmitted from the master earphone. It should be understood that the time sequence corresponding to the standard wait time WA1 and the time sequence corresponding to the slave reception time RX17 may be identical or different. For example, the time sequence corresponding to the standard wait time WA2 is identical with the time sequence corresponding to the slave reception time RX20. When the time sequence corresponding to the standard wait time is identical with the time sequence corresponding to the slave reception time, the slave earphone does not need to be switched to the reception mode from the wait mode, so that the communication efficiency is improved.

It should be noted that the steps in the aforesaid embodiments are not necessarily performed in a certain sequential order. With reference to the description of the embodiments of this application, those ordinarily skilled in the art would appreciate that these steps may be performed in different orders, that is, these steps may be performed in parallel or may be exchanged to be performed.

To sum up, the master earphone carries out a wireless communication with the slave earphone within the extended reception time or the extended transmission time, so that the data reception reliability of the slave earphone and the communication efficiency between the master earphone and the slave earphone are improved.

Finally, it should be noted that the above embodiments are merely for explaining the technical solutions of this application, and are not intended to limit this application. Based on the concept of this application, the above embodiments or the technical features in different embodiments may be combined, the steps may be implemented in any orders, and different variations can be made to this application in different aspects, and for sake of brevity, corresponding details are not described in this specification. Although this application has been described in detail with reference to the aforesaid embodiments, those ordinarily skilled in the art would appreciate that the technical solutions in the aforesaid embodiments can be modified, or part of the technical features can be equivalently substituted. All these modifications or substitutions will not cause the essence of the corresponding technical solutions to deviate from the scope of the technical solutions of the embodiments of this application.

What is claimed is:

1. A wireless communication method for earphones, being applied to a master earphone and a slave earphone, wherein the master earphone wirelessly communicates with an audio source device based on a standard communication protocol, the slave earphone acquires data transmitted from the audio source device to the master earphone in a listening mode, and the wireless communication method comprises:

based on the standard communication protocol, within a cycle of data receiving and transmitting between the master earphone and the audio source device, extending a standard reception time for a communication between the master earphone and the audio source device to obtain an extended reception time, and extending a standard transmission time for the communication between the master earphone and the audio source device to obtain an extended transmission time, wherein according to the standard communication protocol, the cycle of data receiving and transmitting between the master earphone and the audio source device comprises the standard reception time, the extended reception time, a first idle time, the standard transmission time, the extended transmission time and a second idle time;

establishing a wireless communication link between the master earphone and the slave earphone within the extended reception time; and establishing a wireless communication link between the master earphone and the slave earphone within the extended transmission time.

2. The method according to claim 1, wherein after the slave earphone acquires the data transmitted from the audio source device to the master earphone in the listening mode, the master earphone receives result of data acquisition of the slave earphone within the extended reception time.

3. The method according to claim 2, wherein after receiving the data transmitted from the audio source device within the standard reception time, the master earphone integrates result of data reception thereof and the result of data acquisition of the slave earphone to form integrated results and transmits the integrated results to the audio source device within the standard transmission time.

4. The method according to claim 3, wherein the master earphone integrates result of data reception thereof and the result of data acquisition of the slave earphone to form an integrated result and transmits the integrated result to the audio source device within the standard transmission time comprises:

judging, by the master earphone, whether or not the result of data reception of the master earphone and/or the result of data acquisition of the slave earphone have/has error; and requesting, by the master earphone, the audio source device to retransmit the data or transmit other data according to a judgment result.

5. The method according to claim 4, wherein requesting, by the master earphone, the audio source device to retransmit the data or transmit other data according to a judgment result comprises:
   requesting, by the master earphone, the audio source device to retransmit the data within the standard transmission time if the result of data reception of the master earphone has error and/or the result of data acquisition of the slave earphone has error; or
   requesting, by the master earphone, the audio source device to transmit other data within the standard transmission time if the result of data reception of the master earphone and the result of data acquisition of the slave earphone have no error.

6. The method according to claim 5, wherein after requesting the audio source device to retransmit the data or transmit other data, the master earphone transmits a confirmation message to the slave earphone within the extended transmission time to enable the slave earphone to listen to the data once again or to listen to other data.

7. The method according to claim 1, wherein the wireless communication link is a Bluetooth communication link.

8. A master earphone, comprising:
   a memory configured to store an instruction; and
   at least one processor configured to execute the instruction to implement a method comprising:
   based on a standard communication protocol, within a cycle of data receiving and transmitting between the master earphone and the audio source device, extending a standard reception time for a communication between the master earphone and the audio source device to obtain an extended reception time, and extending a standard transmission time for the communication between the master earphone and the audio source device to obtain an extended transmission time, wherein according to the standard communication protocol, the cycle of data receiving and transmitting between the master earphone and the audio source device comprises the standard reception time, the extended reception time, a first idle time, the standard transmission time, the extended transmission time and a second idle time;
   the master earphone receiving data from the audio source device in the standard reception time;
   the master earphone obtaining a result of data acquisition of a slave earphone within the extended reception time;
   the master earphone integrating a result of data reception thereof and the result of data acquisition of the slave earphone to form an integrated result and transmitting the integrated result to the audio source device within the standard transmission time; and
   the master earphone sending a confirmation massage to the slave earphone within the extended transmission time.

9. The master earphone according to claim 8, wherein the master earphone integrating the result of data reception thereof and the result of data acquisition of the slave earphone to form an integrated result and transmitting the integrated result to the audio source device within the standard transmission time comprises:
   the master earphone judging whether or not the result of data reception of the master earphone and/or the result of data acquisition of the slave earphone have/has error; and
   the master earphone requesting the audio source device to retransmit the data or transmit other data according to a judgment result.

10. The master earphone according to claim 9, wherein the master earphone requesting the audio source device to retransmit the data or transmit other data according to a judgment result comprises:
    the master earphone requesting the audio source device to retransmit the data within the standard transmission time if the result of data reception of the master earphone has error and/or the result of data acquisition of the slave earphone has error; or
    the master earphone requesting the audio source device to transmit other data within the standard transmission time if the result of data reception of the master earphone and the result of data acquisition of the slave earphone have no error.

11. An earphone system comprising a master earphone and a slave earphone, the master earphone comprising a first processor and a first memory configured to store a first instruction, the slave earphone comprising a second processor and a second memory configured to store a second instruction, the first and second processors being configured to execute the first and second instructions to implement a method comprising:
    based on a standard communication protocol, within a cycle of data receiving and transmitting between the master earphone and the audio source device, extending a standard reception time for a communication between the master earphone and the audio source device to obtain an extended reception time, and extending a standard transmission time for the communication between the master earphone and the audio source device to obtain an extended transmission time, wherein according to the standard communication protocol, the cycle of data receiving and transmitting between the master earphone and the audio source device comprises the standard reception time, the extended reception time, a first idle time, the standard transmission time, the extended transmission time and a second idle time;
    the master earphone receiving data from the audio source device within the standard reception time;
    the slave earphone listening to the data transmitted from the audio source device to the master earphone within a standard listening time;
    the slave earphone transmitting a result of data acquisition thereof to the master earphone within the extended reception time;
    the master earphone integrating a result of data reception thereof and the result of data acquisition of the slave earphone to form an integrated result and transmitting the integrated result to the audio source device within the standard transmission time; and
    the master earphone sending a confirmation massage to the slave earphone within the extended transmission time.

12. The earphone system according to claim 11, wherein the master earphone integrating the result of data reception thereof and the result of data acquisition of the slave earphone to form an integrated result and transmitting the integrated result to the audio source device within the standard transmission time comprises:
    the master earphone judging whether or not the result of data reception of the master earphone and/or the result of data acquisition of the slave earphone have/has error; and
    the master earphone requesting the audio source device to retransmit the data or transmit other data according to a judgment result.

13. The earphone system according to claim 12, wherein the master earphone requesting the audio source device to retransmit the data or transmit other data according to a judgment result comprises:
   the master earphone requesting the audio source device to retransmit the data within the standard transmission time if the result of data reception of the master earphone has error and/or the result of data acquisition of the slave earphone has error; or
   the master earphone requesting the audio source device to transmit other data within the standard transmission time if the result of data reception of the master earphone and the result of data acquisition of the slave earphone have no error.

14. The earphone system according to claim 13, wherein the slave earphone is switched to a transmission mode according to a switching time which is between the standard listening time and a slave transmission time, the slave earphone transmits the result of data acquisition thereof to the master earphone within the slave transmission time, a time sequence corresponding to the standard listening time is identical with a time sequence corresponding to the standard reception time of the master earphone, and the time sequence corresponding to the switching time is opposite to the time sequence corresponding to the standard listening time.

* * * * *